(12) United States Patent
Cabot et al.

(10) Patent No.: US 6,177,888 B1
(45) Date of Patent: Jan. 23, 2001

(54) WAKE TURBULENCE WARNING AND CAUTION SYSTEM AND METHOD

(75) Inventors: Michael A. Cabot, Long Beach; Nam Q. Chiang, Alhambra, both of CA (US)

(73) Assignee: The Boeing Company, Seattle, WA (US)

(*) Notice: Under 35 U.S.C. 154(b), the term of this patent shall be extended for 0 days.

(21) Appl. No.: 09/391,784

(22) Filed: Sep. 8, 1999

(51) Int. Cl.7 .................................................. G08B 23/00
(52) U.S. Cl. ................................................ 340/968; 701/9
(58) Field of Search .................................... 340/968, 949, 340/961; 701/9, 14; 244/180, 181; 342/26

(56) References Cited

U.S. PATENT DOCUMENTS

| | | |
|---|---|---|
| 4,137,764 | 2/1979 | Hallock et al. . |
| 4,281,383 * | 7/1981 | Lebrun ................................ 340/968 |
| 4,359,640 | 11/1982 | Geiger . |
| 4,914,733 | 4/1990 | Gralnick . |
| 5,181,027 | 1/1993 | Shafer . |
| 5,248,968 | 9/1993 | Kelly et al. . |
| 5,262,773 * | 11/1993 | Gordon ................................ 340/968 |
| 5,382,954 | 1/1995 | Kennedy, Jr. et al. . |
| 5,541,591 | 7/1996 | Bush . |
| 5,657,009 | 8/1997 | Gordon . |
| 5,702,071 | 12/1997 | Kroll et al. . |
| 5,724,040 | 3/1998 | Watnick . |
| 5,845,874 * | 12/1998 | Beasley ................................ 244/1 R |
| 6,002,347 * | 12/1999 | Daly et al. ............................ 340/968 |
| 6,043,757 * | 3/2000 | Patrick ................................. 701/9 |

* cited by examiner

Primary Examiner—Jeffrey A. Hofsass
Assistant Examiner—John Tweel, Jr.
(74) Attorney, Agent, or Firm—Alston & Bird LLP

(57) ABSTRACT

A wake turbulence warning and caution system and method for a protected aircraft tracks and stores a trajectory of a wake trailing behind a nearby aircraft and adjusts the wake position for the effect of local wind velocity, and then calculates a distance and time to closure between the protected aircraft and the wake. A caution is annunciated aurally and/or on a navigation map display and/or on a primary flight display if the distance or time to closure is less than a first predetermined threshold, and a warning is annunciated if the distance or time to closure is less than a second predetermined threshold. The wake trajectory is calculated based on range, bearing, and altitude information about the nearby aircraft supplied by a Traffic Collision Avoidance System (TCAS) aboard the protected aircraft, and based on inertial position and attitude of the protected aircraft supplied by an inertial reference system (IRS). Local wind velocity is calculated based on the aircraft inertial velocity from the IRS, true air speed from an air data computer (ADC), and angle of attack and sideslip angles provided by sensors aboard the aircraft. Wake tracking, wind velocity calculations, and caution and warning functions can be implemented in software within a TCAS computer and/or a flight management system aboard the protected aircraft.

20 Claims, 3 Drawing Sheets

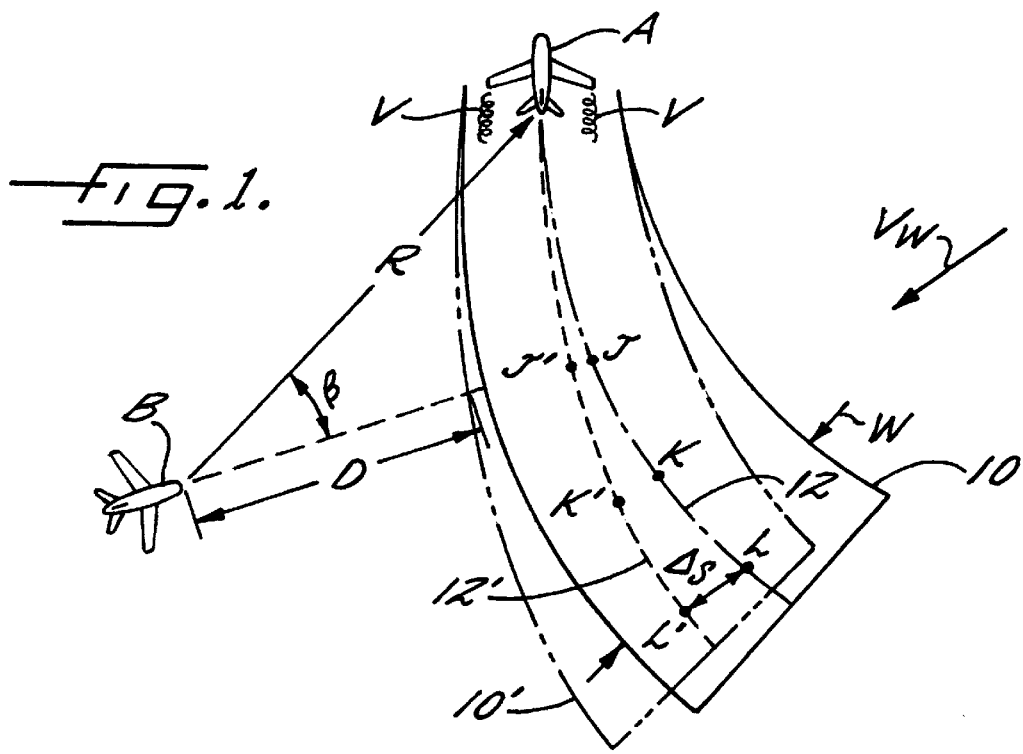
Fig. 1.
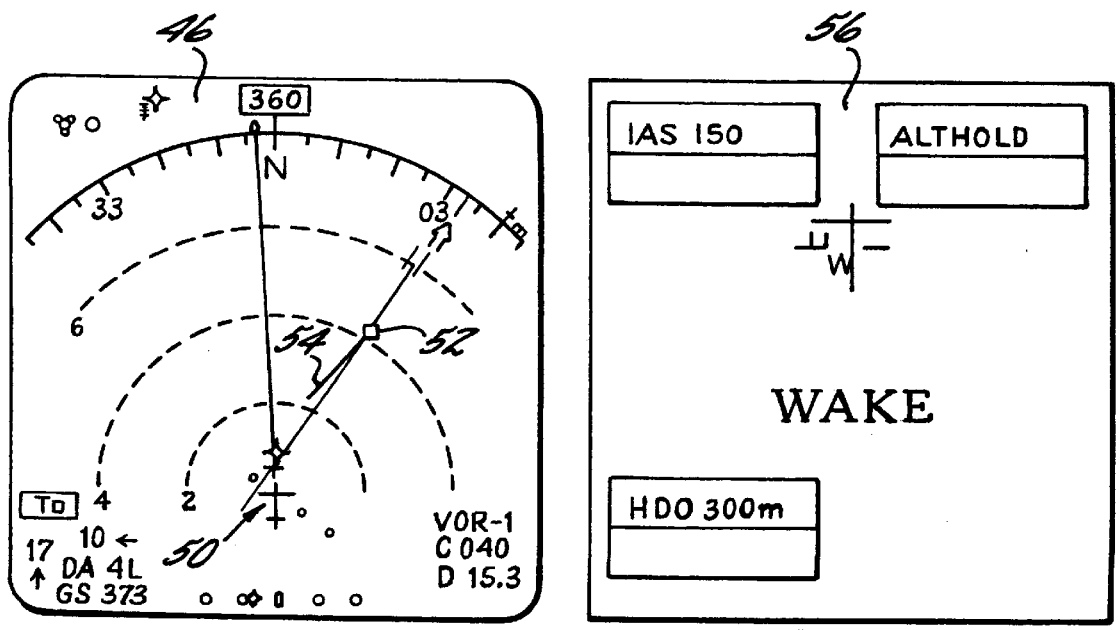
Fig. 3.
Fig. 4.

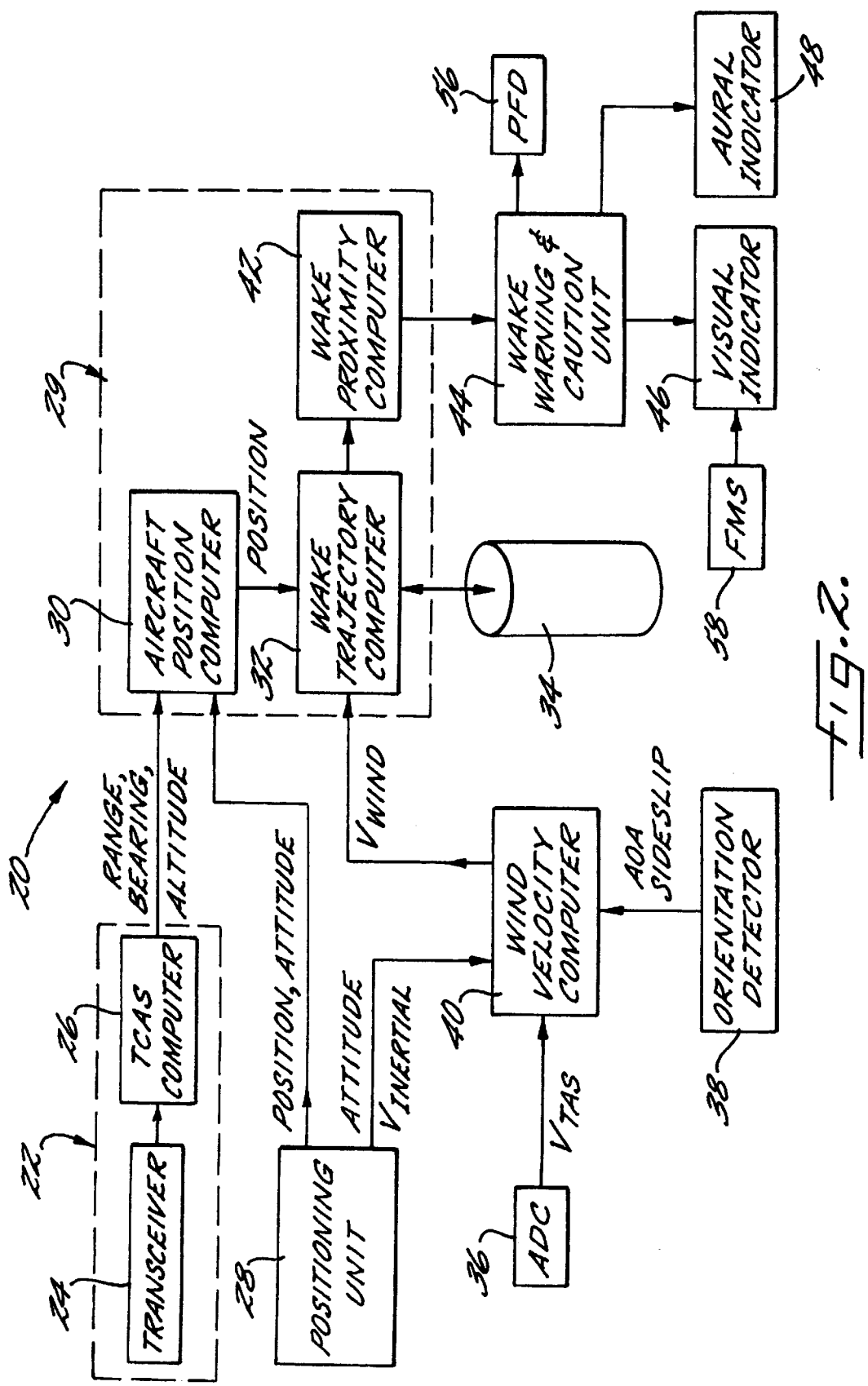

WAKE TURBULENCE WARNING AND CAUTION SYSTEM AND METHOD

FIELD OF THE INVENTION

The invention relates to aircraft traffic control systems and methods, and, more particularly, to systems and methods for warning of and/or avoiding flying an aircraft into a wake of another nearby aircraft.

BACKGROUND OF THE INVENTION

The vortical wake shed from a flying aircraft can pose hazards for any aircraft that happens to fly into the wake. The turbulence and vortical air velocities of a wake can cause sudden alterations in the aerodynamic forces exerted on an aircraft flying into the wake, resulting in effects that can include buffeting or bumping of the aircraft, sudden changes in attitude of the aircraft, and sudden changes in altitude of the aircraft. The consequences of flying into a wake tend to be of greater concern at low altitudes, such as during takeoff and landing operations at an airport, because there may not be sufficient time and altitude to recover from a sudden wake-induced aircraft motion before the aircraft impacts the ground. Furthermore, the strengths of wakes produced by aircraft tend to be greater during relatively low-speed takeoff and landing operations than during higher-speed flight because the strength of a vortex shed from the tip of a lifting surface is inversely proportional to the air velocity over the surface. Thus, interference from aircraft wake turbulence is a significant problem that can compromise safe operation of an aircraft.

A number of systems have been proposed for detecting, warning of, and/or avoiding contact between an aircraft and the wake of another aircraft. For example, U.S. Pat. No. 5,845,874 describes a system and method for creating visual images of aircraft wake vortices by mathematical modeling of the vortices based on characteristics of the aircraft that is creating them. The vortex modeling also takes into account the effects of atmospheric conditions such as wind on the vortices. One embodiment described in the patent provides a visual "heads-up" display in an aircraft on which the simulated wake vortices are displayed for each aircraft in the vicinity of the subject aircraft. It is said that the display of the wake vortices enables the pilot to "see" the vortices so that he or she can identify and avoid them. A disadvantage of this system is that when many aircraft are sharing the same airspace with the subject aircraft, such as around a busy airport, the heads-up display could become so cluttered with the simulated wakes of the other aircraft that the pilot may have difficulty distinguishing the wakes that could pose a hazard from those that can be safely ignored.

SUMMARY OF THE INVENTION

The present invention seeks to overcome the above-noted drawback by providing, in preferred embodiments, a wake turbulence warning and caution system and method for an aircraft that alerts a crew member to a potential conflict with the wake of another aircraft only when the system determines that intersection of the aircraft with the wake is about to occur within a predetermined amount of time. Thus, the crew is able to concentrate on the wake or wakes that present real potential hazards without being distracted by an excess of information about other wakes that do not present hazard situations. Additionally, in certain preferred embodiments of the invention, the wake turbulence warning and caution system can utilize avionics components that are already mandatory equipment on larger commercial aircraft, and thus the wake turbulence warning and caution system can be implemented relatively easily and inexpensively without requiring new hardware in the aircraft or on the ground. More specifically, the system can be implemented by making changes in software in one or more programmable components of existing avionics components.

In accordance with a preferred embodiment of the invention, a wake turbulence warning and caution system for an aircraft includes a positioning unit aboard the aircraft and operable to determine a position of the aircraft relative to a fixed reference. The system also includes a traffic collision avoidance unit aboard the aircraft, the traffic collision avoidance unit being operable to transmit and receive signals indicative of at least an altitude of the aircraft transmitting said signals. The traffic collision avoidance unit is further operable to determine an altitude of a nearby aircraft having another traffic collision avoidance unit transmitting said signals, and to determine a range and bearing to the nearby aircraft. The system further includes a wake-tracking unit aboard the aircraft and arranged to receive the position of the aircraft from the positioning unit. The wake-tracking unit is operable to determine a position of the nearby aircraft relative to the fixed reference based on the position from the positioning unit and the altitude, range, and bearing of the nearby aircraft, to track a trajectory of a wake volume from the nearby aircraft, and to determine at least one of a distance and a time to closure between the aircraft and the wake volume of the nearby aircraft. The system also includes a warning and caution unit aboard the aircraft and in communication with the wake-tracking unit, the warning and caution unit being operable to provide an alert when at least one of the distance and time to closure is less than a predetermined threshold.

Preferably, the traffic collision avoidance unit includes a software-programmable component and the wake-tracking unit is implemented in software within said component. Standard traffic collision avoidance system (TCAS) units, which have become mandatory equipment on most commercial passenger aircraft, are suitable for use with the present invention. The wake-tracking unit's functions can be programmed into a standard TCAS unit.

Alternatively, on aircraft equipped with a flight management system having a software-programmable component, the wake-tracking unit's functions can be implemented in software within the programmable component of the flight management system. Still further, some of the wake-tracking unit's functions can be programmed into a TCAS unit while other functions are programmed into a flight management system. Additionally, some or all of the functions of the warning and caution unit can be implemented in software in a TCAS unit and/or a flight management system.

The wake turbulence warning and caution system preferably accounts for the effect of local wind on the trajectory of the wake volume from a nearby aircraft. To this end, the system preferably includes a system aboard the aircraft for determining magnitude and direction of local wind velocity, and the wake-tracking unit preferably is operable to adjust the trajectory of the wake volume to take into account shifting of the wake volume by the local wind. In a preferred embodiment of the invention, the positioning unit is operable to determine magnitude and direction of an inertial velocity of the aircraft relative to the fixed reference. The system for determining local wind velocity includes the positioning unit, an air speed detector operable to determine a true air speed of the aircraft, an aircraft orientation detector operable to determine orientation information of the aircraft including at least angle of attack and sideslip thereof, and a computational unit operable to compute local wind velocity magnitude and direction based on the inertial velocity, true air speed, and orientation information.

To calculate the shifting of the wake trajectory by the local wind, the wake-tracking unit advantageously is operable to store the trajectory of the wake volume in the form of a series of data points, each data point having associated therewith at least a position of the nearby aircraft and a time at which the nearby aircraft occupied said position. The wake-tracking unit is further operable to adjust the position portion of each data point of the trajectory based on the local wind velocity multiplied by the difference between current time and the time associated with said data point.

The wake turbulence warning and caution system preferably also takes into account the expansion of the wake volume downstream of the aircraft producing the wake. This can be done in various ways. For example, the height and width of the wake volume can be assumed to grow linearly with distance behind the aircraft. Furthermore, at some distance behind the aircraft the wake will dissipate, and thus the wake-tracking unit preferably assumes that the wake terminates at a predetermined distance behind the aircraft. This distance can be made a function of a characteristic of the aircraft, such as the aircraft type, weight, or other factor that tends to correlate with the strength of the wake vortices. Where an advanced TCAS unit providing aircraft-identifying information is aboard the wake-producing aircraft, the wake turbulence warning and caution system can be enabled to determine one or more characteristics of the wake-producing aircraft and to use such characteristics in calculating wake parameters.

The wake warning and caution unit preferably provides a caution when the time to closure with the wake of a nearby aircraft is less than a first predetermined amount, for example less than 30 seconds. If the time to closure drops to less than a second predetermined amount, for example 15 seconds, then the warning and caution unit provides a warning. The caution and/or warning can be provided visually and/or aurally. In accordance with one preferred embodiment, an aural caution is sounded and a visual caution is displayed on a display device. A warning is also presented both aurally and visually on the display device, but in a manner distinguishable from the caution. For instance, an aural caution can be the word "caution" issued once by a voice simulation unit in the cockpit, and a visual caution can be the word "wake" annunciated on a primary flight display (PFD). Additionally, the visual caution can also include a visual representation of the wake on a navigation map display, such as that used in connection with TCAS systems, showing relative positions of the aircraft and the wake. The wake on the navigation map display can be displayed in yellow to signify a caution. For a warning, the word "wake" can be issued repeatedly by the voice simulation unit, the word "wake" can be displayed in flashing manner on the PFD, and/or the wake on the navigation map display can be displayed in red.

BRIEF DESCRIPTION OF THE DRAWINGS

The above and other objects, features, and advantages of the invention will become more apparent from the following description of certain preferred embodiments thereof, when taken in conjunction with the accompanying drawings in which:

FIG. 1 is a schematic depiction of two aircraft, showing a wake volume trailing behind one of the aircraft, and illustrating shifting of the wake volume by local wind;

FIG. 2 is a block diagram of a wake turbulence warning and caution system in accordance with a preferred embodiment of the invention;

FIG. 3 is a view of a navigation map display for displaying a caution and warning in accordance with a preferred embodiment of the invention;

FIG. 4 is a view of a primary flight display showing a caution or warning being displayed in accordance with a preferred embodiment of the invention.

DETAILED DESCRIPTION OF THE DRAWINGS

Figure 5:
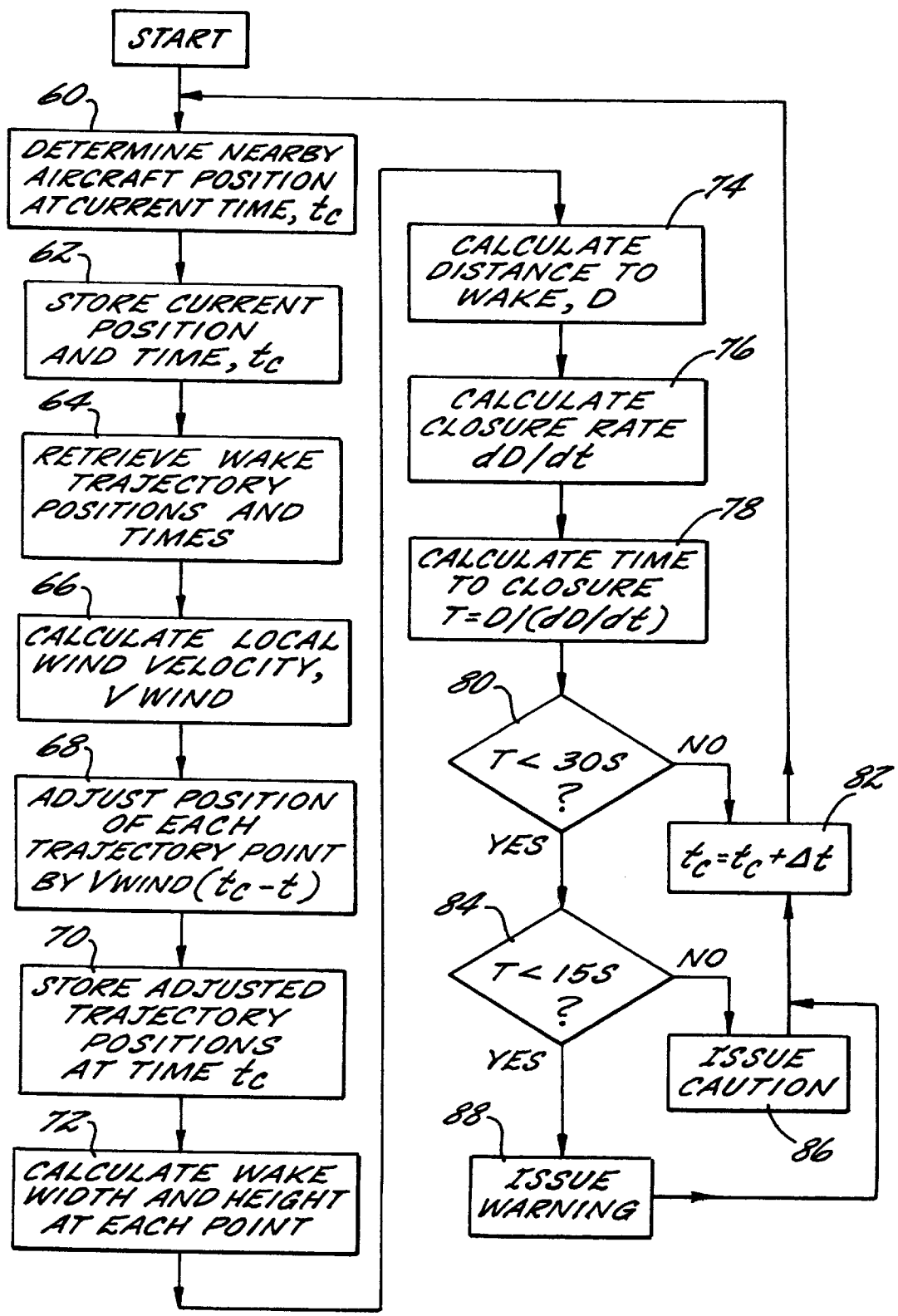
FIG. 5 is a flow chart depicting a method in accordance with one preferred embodiment of the invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

With reference to FIG. 1, there is shown a schematic depiction of two aircraft A and B flying in general proximity to each other, with vortices V trailing from the wingtips of aircraft A. The vortices V and other turbulence induced by aircraft A create a trailing wake volume 10 shown in solid line. Assuming that the air through which aircraft A flies is still, the wake volume 10 will occupy a position generally corresponding to the trajectory 12 along which the aircraft A has flown. The wake volume 10 will generally have a width W and a height exceeding that of the aircraft, and the width and height of the wake volume tend to increase with increasing distance downstream of the aircraft.

The aircraft B is shown flying along a flight path that intersects the wake volume 10. The turbulence in the wake volume 10 can cause problems for any aircraft flying through it, and accordingly it is desirable to provide an indication to the crew of aircraft B of proximity between the aircraft B and the wake volume of any nearby aircraft such as aircraft A, so that the crew can take suitable precautions, which may include changing the flight path to avoid flying through the wake, if necessary.

The present invention provides systems and methods for providing an indication of proximity of an aircraft to a wake volume by tracking the trajectory of the wake-producing aircraft, which corresponds to the trajectory of the wake volume assuming the air is still. Preferably, the wake volume trajectory is then adjusted to account for the effect of local wind velocity on the wake position. A distance from the aircraft to the wake volume is determined, and preferably a closure rate and time to closure between the aircraft and the wake volume are also determined. A caution or warning is then provided if the distance or time to closure is less than a predetermined threshold.

FIG. 2 shows a wake turbulence warning and caution system (WTWCS) 20 in accordance with a preferred embodiment of the invention. The system 20 employs a Traffic Collision Avoidance System (TCAS) 22 located aboard the aircraft to be protected. The TCAS 22 includes a transceiver 24 operable to receive signals transmitted by another TCAS unit aboard a nearby aircraft and to transmit signals for receipt by other aircraft. TCAS units are in widespread use, having been made mandatory for most commercial passenger aircraft in the United States. The operation of TCAS units is well known and hence will not be discussed in depth herein. As a brief summary of its operation, however, a TCAS unit periodically transmits interrogation signals. These signals are received by radar transponder units aboard other nearby aircraft, which transponder units are operable to respond to the interrogation signals by transmitting a reply signal reporting the altitude of the responding aircraft. The transceiver 24 of the TCAS unit 22 receives the reply signal, and a TCAS computer 26 determines the range from the interrogating aircraft to the responding aircraft based on the elapsed time from the sending of the interrogation signal to the receipt of the reply signal, and also extracts the altitude information from the reply signal. Thus, range and altitude of the nearby aircraft are ascertained. On improved or later-generation TCAS units, the bearing from the protected aircraft to the nearby aircraft is also determined by various means, generally involving using a multi-element antenna system capable of determining phase differences between signals received by the several elements of the antenna and converting the phase differences into an approximate bearing to the nearby aircraft. Thus, as indicated in FIG. 2, the TCAS unit 22 provides an output containing range, bearing, and altitude of the nearby aircraft.

The WTWCS 20 also includes a positioning unit 28 aboard the protected aircraft. The positioning unit 28 is operable to determine a position, attitude, and velocity of the protected aircraft relative to an inertial reference. For example, the positioning unit 28 can comprise an Inertial Reference System (IRS), a Global Positioning System (GPS), or the like. Position and attitude information are sent by the positioning unit 28 to a wake-tracking unit 29 aboard the protected aircraft. The wake-tracking unit 29 includes an aircraft position computer 30 that receives the position and attitude information and also receives the range, bearing, and altitude information about the nearby aircraft from the TCAS unit 22. The aircraft position computer 30 is operable to calculate the position of the nearby aircraft relative to the inertial reference used by the positioning unit 28, based on the position of the protected aircraft and the relative positions of the protected and nearby aircraft as defined by the range, bearing, and altitude information from the TCAS unit 22.

The wake-tracking unit 29 also includes a wake trajectory computer 32. In still air, the trajectory of the wake from an aircraft corresponds essentially to the trajectory or flight path along which the aircraft has flown. Accordingly, the wake trajectory computer 32 tracks the wake trajectory by storing, in a suitable data storage device 34, a series of data points representing the position of the wake-producing aircraft at a series of sequential times. The positions can be stored in any suitable inertial-based coordinates. The data points can be acquired by periodically sampling the input signals to the aircraft position computer 30 and performing the position calculations based on the sampled input data. Other data acquisition and processing schemes can alternatively be used to produce the series of position data points.

Preferably, the trajectory of the wake volume is adjusted to account for the effect of local wind on the wake. To this end, the WTWCS 20 preferably also includes an air data computer (ADC) 36, an orientation detector 38, and a wind velocity computer 40 all located aboard the protected aircraft. The ADC 36, which is standard equipment on many aircraft, is operable to detect a true air speed $V_{TAS}$ of the protected aircraft. The orientation detector 38 is operable to determine the angle of attack and sideslip angle of the protected aircraft, and is also standard equipment on many aircraft. The wind velocity computer 40 is operable to compute the magnitude and direction of the local wind velocity $V_{WIND}$ relative to inertial reference by vectorially subtracting the inertial velocity vector from a relative air velocity vector whose magnitude is the true air speed $V_{TAS}$ and whose direction can be determined using standard equations based on the aircraft attitude supplied by the positioning unit 28 and the angle of attack and sideslip angle supplied by the orientation detector 38. Methods for calculating local wind velocity based on these parameters are known and thus are not further described herein.

With reference to FIG. 1, the wake volume trajectory 12 is adjusted to account for the effect of the local wind velocity $V_{WIND}$ in the following manner. First, in order to permit the wake trajectory computer 32 to account for the effect of local wind, it stores a time associated with the position for each data point that is stored. For instance, as shown in FIG. 1, the aircraft A has flown along the flight path 12, such that the aircraft at a time $t_1$, was at the point L, at a later time $t_2$ was at the point K, at a still later time $t_3$ was at the point J, and so forth. As the WTWCS aboard the aircraft B tracks the trajectory of the aircraft A, the wake trajectory computer 32 stores positions for each of the points J, K, L, and also stores the times respectively associated with each data point. At a current time $t_c$, the position portion of a given data point is adjusted by an incremental position vector $\Delta S$ that is determined by multiplying the local wind velocity vector by the difference between the current time $t_c$ and the time associated with the data point. For instance, where the point L has the time $t_1$ associated with it, the incremental velocity vector $\Delta S$ is equal to $V_{WIND}(t_c-t_1)$. When the incremental velocity vector $\Delta S$ is applied to the position portion of the data point L, the point is shifted to L'. The other data points making up the wake volume trajectory are similarly adjusted for the local wind, such that point K shifts to K', point J shifts to J', and so on. The wake volume 10 is thus shifted to the position indicated by the wake volume 10' shown in dashed lines in FIG. 1.

The wake-tracking unit 29 further includes a wake proximity computer 42 operable to compute a distance D from the protected aircraft to the wake volume 10' based on the position of the protected aircraft supplied by the aircraft position computer 30 and the wake trajectory supplied by the wake trajectory computer 32. Preferably, the wake volume width W and height are calculated by the wake proximity computer 42. Various schemes can be used for calculating the wake volume dimensions. Advantageously, a simple scheme can be used whereby the wake volume is assumed to have an initial width and height at the position of the wake-producing aircraft, and the width and height are assumed to increase at a defined rate with distance behind the aircraft. For instance, the wake volume can be assumed to be 100 feet in height and 200 feet in width at the position of the aircraft, and can be assumed to grow linearly to 100 feet above, 400 feet below, and 200 feet on either side of the wake trajectory 12' at one nautical mile behind the aircraft. Additionally, since the wake will eventually dissipate, the wake volume can be assumed to have a defined length, such as one nautical mile. Of course, this is but one illustrative example, and it will be appreciated that there are many other schemes that can be used to determine wake volume dimensions. For example, if the TCAS unit 22 has the capability of detecting the type or size of the nearby wake-producing aircraft, this information could be used to adjust the wake volume dimensions, such that smaller aircraft have smaller calculated wake volumes and larger aircraft have larger calculated wake volumes.

The distance D from the protected aircraft to the wake volume is calculated by first calculating a distance to the wake trajectory 12', which is assumed to pass centrally through the width and height of the wake volume, and then subtracting a distance from the wake trajectory 12' to the near edge of the wake volume.

The wake proximity computer 42 preferably is also operable to calculate a closure rate between the protected aircraft and the wake volume based on the time rate of change of the distance D, and is operable to determine a time to closure by dividing the distance by the closure rate. Either the distance to the wake volume or the time to closure can be used by the WTWCS 20 in determining whether the protected aircraft is in such proximity to the wake volume that a caution or warning should be issued to the crew.

The WTWCS 20 includes a wake warning and caution unit 44 that is operable to compare the distance or the time to closure with one or more predetermined threshold values, and to cause an indication of proximity to the wake volume to be annunciated if the distance or time to closure is less than the threshold. The proximity indication can be annunciated aurally and/or visually. Preferably, both aural and visual indications are provided. To this end, the system includes a visual indicator 46 and an aural indicator 48. It is also advantageous to provide a two-stage proximity indication whereby a first type of indication is issued if the distance or time to closure is less than a first threshold, and a second type of indication is issued if the distance or time to closure is less than a second threshold. For instance, an advisory or caution may be issued if the time to closure is less than 30 seconds, and a warning may be issued if the time to closure is less than 15 seconds.

Various types of aural and visual indicators can be used. FIGS. 3 and 4 depict two types of visual indicators. FIG. 3 shows a navigation map display 46 of the type commonly used in aircraft for indicating the heading of the protected aircraft and for displaying TCAS-generated symbols indicating the relative positions of aircraft in the vicinity of the protected aircraft. On the display 46, the protected aircraft is indicated by the aircraft symbol 50. A nearby aircraft is displayed with a square symbol 52. When the wake warning and caution unit 44 determines that the distance or time to closure with the wake volume of the aircraft 52 is less than a predetermined threshold, it causes a wake symbol 54 to be displayed trailing behind the aircraft symbol 52. Preferably, the wake warning and caution unit 44 causes the symbols 52, 54 to be annunciated as a caution, such as in the color yellow, if the distance or time to closure is less than a first threshold, and to be annunciated as a warning, such as in the color red, if the distance or time to closure is less than a second threshold. Of course, although only a single nearby aircraft is shown on the map display 46, it will be understood that the wake-tracking calculations are performed for all aircraft within a given distance (e.g., 10 nautical miles) of the protected aircraft, and all aircraft near the protected aircraft would be displayed on the map display. Preferably, however, wake symbols would be displayed only for those aircraft for which the distance or time to closure with the wake is less than one or both of the thresholds.

Similarly, the aural indicator 46 preferably provides a two-stage caution and warning indication. For example, if the distance or time to closure is less than a first threshold, the aural indicator can issue an aural caution, such as the word "wake" annunciated once. If the distance or time to closure is less than a second threshold, the aural indicator can issue an aural warning, such as the word "wake" annunciated repeatedly.

It may also be desirable to provide a visual caution and warning on the aircraft's primary flight display (PFD) 56 as shown in FIG. 4. A PFD is commonly used in aircraft to display information such as the indicated air speed (IAS) and heading of the aircraft. A caution can be annunciated on the PFD, for example by displaying the word "wake" as shown in FIG. 4. A warning can be annunciated by a flashing word "wake" on the PFD. The cautions and warnings can be disabled below a given altitude for landing, if desired.

The WTWCS 20 shown in FIG. 2 preferably is located entirely aboard the protected aircraft. Although the system has been described as including a TCAS unit 22 supplying range, bearing, and altitude information to an aircraft position computer 30, other types of equipment could be used for supplying the information needed by the system to determine the position of a nearby wake-producing aircraft. It is advantageous, however, to employ a TCAS unit because such units are already standard (and in many cases mandatory) on most commercial passenger aircraft.

It will also be appreciated that many of the components of the system 20 shown in FIG. 2 can be implemented in software, which can be programmed into existing computers aboard an aircraft. For instance, the functions of the aircraft position computer 30, the wake trajectory computer 32, the wind velocity computer 40, the wake proximity computer 42, and the wake warning and caution unit 44 can be implemented in part or in whole by software programmed in the TCAS computer 26 of a standard TCAS unit. Accordingly, the WTWCS 20 requires no new hardware for a TCAS-equipped aircraft, and does not require any new ground-based hardware or software.

Where the aircraft is equipped with a flight management system (FMS) 58 (FIG. 1), the above-noted functions alternatively can be implemented in software within the FMS. As still another option, these functions can be implemented in part in the TCAS computer and in part in the FMS.

FIG. 5 illustrates a method for determining and warning of proximity to a wake in accordance with one preferred embodiment of the invention. As indicated at 60, when the protected aircraft receives a signal from a nearby aircraft, equipment that is preferably located aboard the protected aircraft determines the position of the nearby aircraft relative to an inertial reference at the current time $t_c$. The position of the nearby aircraft and the current time are stored in a trajectory storing device as indicated at 62. It will be understood that if the nearby aircraft has been tracked for some time by the protected aircraft's wake tracking equipment, there will already have been stored in the trajectory storing device a number of other data points having positions and times corresponding to prior passes through the logic depicted in FIG. 5. Thus, at 64, the wake trajectory data points are retrieved.

Next, the wake trajectory is adjusted to account for the effect of local wind. At 66, the local wind velocity is calculated. Then, at 68, the position portion of each data point is adjusted by an incremental vector defined by the wind velocity vector multiplied by the difference between current time and the time associated with the data point. This procedure is applied to all of the trajectory data points, and the adjusted data points are stored at 70. The time portion stored for each adjusted data point is equal to the current time $t_c$.

The wake volume width and height at each trajectory point are calculated at 72. Next, based on the adjusted wake trajectory and the wake dimensions, the distance from the protected aircraft to the wake volume are calculated at 74.

Furthermore, a closure rate is determined at 76 based on differentiated distance to the wake volume. Then, based on the distance to the wake and the closure rate, a time to closure with the wake volume is calculated at 78.

As indicated at 80, if the time to closure T is not less than 30 seconds, for example, then the current time is incremented by an amount Δt at 82 and the calculations are repeated beginning again at 60 at the new time. If, however, the time to closure is less than 30 seconds, then a further check is made to determine whether the time to closure is less than 15 seconds, as indicated at 84. If the time is not less than 15 seconds (but is less than 30 seconds), then at 86, a caution is issued. If the time to closure is less than 15 seconds, then a warning is issued as shown at 88. After either a warning or caution is issued, the time is incremented at 82 and the calculations are again started beginning at 60.

Those of ordinary skill in the art of aircraft traffic control and guidance will recognize that the WTWCS 20 could also be designed to perform a guidance function whereby the crew of the protected aircraft is given a guidance advisory, similar to the Resolution Advisories (RAs) issued by TCAS systems, informing the crew as to a suggested flight path or maneuver for avoiding a wake. For instance, the warning and caution unit 44 can be programmed with threat resolution logic for determining an appropriate vertical and/or horizontal maneuver that will ensure an adequate separation between the protected aircraft and the wake. The suggested maneuver can be displayed on an appropriate visual display in the cockpit.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A wake turbulence warning and caution system for an aircraft, comprising:
   a positioning unit aboard the aircraft and operable to determine a position of the aircraft relative to a fixed reference;
   a traffic collision avoidance unit aboard the aircraft, the traffic collision avoidance unit being operable to transmit and receive signals indicative of at least an altitude of the aircraft transmitting said signals and being further operable to determine an altitude of a nearby aircraft having another traffic collision avoidance unit transmitting said signals and to determine a range and bearing to the nearby aircraft;
   a wake-tracking unit aboard the aircraft and arranged to receive the position of the aircraft from the positioning unit, the wake-tracking unit being operable to determine a position of the nearby aircraft relative to the fixed reference based on the position from the positioning unit and the altitude, range, and bearing of the nearby aircraft, to track a trajectory of a wake volume from the nearby aircraft, and to determine at least one of a distance and a time to closure between the aircraft and the wake volume of the nearby aircraft; and
   a wake warning and caution unit aboard the aircraft and in communication with the wake-tracking unit, the warning and caution unit being operable to provide an indication of proximity to the wake volume when at least one of the distance and time to closure is less than a predetermined threshold.

2. The wake turbulence warning and caution system of claim 1, wherein the traffic collision avoidance unit includes a software-programmable component and the wake-tracking unit is implemented in software within said component.

3. The wake turbulence warning and caution system of claim 1, further comprising a flight management system aboard the aircraft, and wherein the wake-tracking unit is implemented in software within at least one of the traffic collision avoidance unit and the flight management system.

4. The wake turbulence warning and caution system of claim 1, further comprising a system aboard the aircraft for determining magnitude and direction of local wind velocity, and wherein the wake-tracking unit is operable to adjust the trajectory of the wake volume to take into account shifting of the wake volume by the local wind.

5. The wake turbulence warning and caution system of claim 4, wherein the positioning unit is operable to determine magnitude and direction of an inertial velocity of the aircraft relative to the fixed reference, and wherein the system for determining local wind velocity includes the positioning unit, an air speed detector operable to determine a true air speed of the aircraft, an aircraft orientation detector operable to determine orientation information of the aircraft including at least angle of attack and sideslip thereof, and a computational unit operable to compute local wind velocity magnitude and direction based on the inertial velocity, true air speed, and orientation information.

6. The wake turbulence warning and caution system of claim 5, wherein the positioning unit comprises an inertial reference system.

7. The wake turbulence warning and caution system of claim 5, wherein the wake-tracking unit is operable to store the trajectory of the wake volume in the form of a series of data points, each data point having associated therewith at least a position and a time at which the wake volume occupied said position.

8. The wake turbulence warning and caution system of claim 7, wherein the wake-tracking unit is operable to adjust the position portion of each data point of the trajectory based on the local wind velocity multiplied by the difference between current time and the time associated with said data point.

9. The wake turbulence warning and caution system of claim 1, wherein the wake warning and caution unit is operable to provide a caution when the time to closure is less than a first predetermined amount.

10. The wake turbulence warning and caution system of claim 9, wherein the wake warning and caution unit is operable to provide a warning when the time to closure is less than a second predetermined amount.

11. The wake turbulence warning and caution system of claim 1, wherein the wake warning and caution unit includes at least one of a visual display device and an aural indicator device.

12. The wake turbulence warning and caution system of claim 1, wherein the wake-tracking unit is operable to calculate a width and height of the wake volume at each of a plurality of points along the wake trajectory, at least one of the width and height of the wake at each point being calculated as a function of a distance of said point behind the nearby aircraft.

13. A wake turbulence warning and caution system for aircraft, comprising:

a signal-generating device aboard a sensed aircraft, the signal-generating device transmitting signals having properties enabling position information to be determined for the sensed aircraft relative to a location at which said signals are received;

a receiving device aboard a sensing aircraft, the receiving device being operable to receive said signals from the sensed aircraft and to determine position information of the sensed aircraft relative to the sensing aircraft;

a wake-tracking unit aboard the sensing aircraft, the wake-tracking unit being operable to determine and track a trajectory of a wake volume from the sensed aircraft based on the position information for the sensed aircraft and being further operable to determine a distance from the sensing aircraft to the wake volume and a closure rate and a time to closure with the wake volume; and a wake warning and caution unit aboard the sensing aircraft and operable to provide an indication of proximity of the sensing aircraft to the wake volume of the sensed aircraft when at least one of the distance and time to closure is less than a threshold amount.

14. The wake turbulence warning and caution system of claim 13, wherein the wake warning and caution unit includes a visual display operable to display relative positions of the sensing aircraft and the sensed aircraft and wake trajectory of the sensed aircraft.

15. The wake turbulence warning and caution system of claim 14, wherein the visual display comprises a navigation map operable to display symbols representing the sensing aircraft and the sensed aircraft and wake trajectory, the wake warning and caution unit being operable to cause the wake trajectory symbol to be displayed when at least one of the distance to the wake volume and the time to closure with the wake volume is less than the predetermined threshold.

16. The wake turbulence warning and caution system of claim 15, wherein the wake warning and caution unit is operable to cause the wake trajectory symbol to be displayed in a first manner when at least one of the distance to the wake volume and the time to closure with the wake volume is less than a first predetermined threshold, and to cause the wake trajectory symbol to be displayed in a second manner when at least one of the distance to the wake volume and the time to closure with the wake volume is less than a second predetermined threshold.

17. The wake turbulence warning and caution system of claim 13, wherein the wake-tracking unit is operable to calculate at least one dimension of the wake volume at each of a plurality of points along the wake trajectory, said dimension at each point being calculated as a function of distance of said point behind the sensed aircraft.

18. A method for warning of proximity of a protected aircraft to a wake produced by a nearby aircraft, comprising:

determining a position of the nearby aircraft relative to an inertial reference at each of a series of sequential times;

storing a trajectory of a wake volume of the nearby aircraft as a series of data points defining positions of the nearby aircraft at said times;

calculating a distance from the protected aircraft to the wake volume based on a position of the protected aircraft relative to the inertial reference and further based on the trajectory of the wake volume;

calculating a time to closure between the protected aircraft and the wake volume based on the distance to the wake volume and an inertial velocity of the protected aircraft; and providing an indication of proximity of the protected aircraft to the wake volume when the time to closure is less than a predetermined threshold.

19. The method of claim 18, wherein storing the wake volume trajectory further comprises storing a time associated with the position portion of each data point, and further comprising accounting for effect of local wind on the wake volume trajectory by:

determining a velocity of the local wind at a current time; and adjusting the position portion of each data point of the trajectory by an amount equal to the local wind velocity multiplied by the difference between the current time and the time associated with the data point.

20. The method of claim 18, wherein the indication of proximity to the wake volume is provided in a first manner when the time to closure is less than a first predetermined threshold and in a second manner when the time to closure is less than a second predetermined threshold.

* * * * *